US008175792B2

(12) United States Patent
Kim et al.

(10) Patent No.: US 8,175,792 B2
(45) Date of Patent: May 8, 2012

(54) METHOD AND SYSTEM FOR MEASURING TRAFFIC INFORMATION IN CDMA NETWORK

(75) Inventors: Shin-Jae Kim, Gyeonggi-do (KR); Kyung-Yup Kim, Seoul (KR)

(73) Assignee: KT Corporation, Gyeonggi-do (KR)

( * ) Notice: Subject to any disclaimer, the term of this patent is extended or adjusted under 35 U.S.C. 154(b) by 901 days.

(21) Appl. No.: 12/293,702

(22) PCT Filed: Mar. 20, 2007

(86) PCT No.: PCT/KR2007/001366
§ 371 (c)(1),
(2), (4) Date: Sep. 19, 2008

(87) PCT Pub. No.: WO2007/108641
PCT Pub. Date: Sep. 27, 2007

(65) Prior Publication Data
US 2009/0125220 A1    May 14, 2009

(30) Foreign Application Priority Data

Mar. 20, 2006  (KR) .................... 10-2006-0025345
Mar. 20, 2006  (KR) .................... 10-2006-0025346

(51) Int. Cl.
*G06F 19/00* (2011.01)
(52) U.S. Cl. ........................ 701/117; 701/119
(58) Field of Classification Search ............. 701/117, 701/119
See application file for complete search history.

(56) References Cited

U.S. PATENT DOCUMENTS 6,744,745 B1   6/2004  Fukui

| | | | |
|---|---|---|---|
| 7,903,029 B2 * | 3/2011 | Dupray | 342/457 |
| 2004/0249560 A1 | 12/2004 | Kim | |
| 2009/0285186 A1 * | 11/2009 | Chin et al. | 370/335 |
| 2010/0087204 A1 * | 4/2010 | Islam et al. | 455/456.1 |

FOREIGN PATENT DOCUMENTS

| | | |
|---|---|---|
| JP | 7-231473 A | 8/1995 |
| JP | 10-40484 | 2/1998 |
| JP | 11-252630 A | 9/1999 |
| JP | 2000-311286 A | 11/2000 |
| JP | 2001-189958 A | 7/2001 |
| JP | 2003-006509 A | 1/2003 |
| JP | 2003-339070 A | 11/2003 |
| JP | 2003-533927 A | 11/2003 |
| JP | 2004-280553 | 10/2004 |
| JP | 2005-115625 | 4/2005 |
| JP | 2005-301643 | 10/2005 |
| JP | 2006-33207 A | 2/2006 |
| KR | 10-19980065027 | 10/1998 |
| KR | 10-19990017557 A | 3/1999 |
| KR | 10-20020044627 A | 6/2002 |
| KR | 10-20030039578 A | 5/2003 |
| KR | 10-20030061493 A | 7/2003 |

(Continued)

*Primary Examiner* — Hussein A. Elchanti

(57) ABSTRACT

A method for measuring traffic information, conducted by a traffic information analyzing device interworking with a radio operating device connected to BSS (Base Station Subsystem) of a synchronous CDMA (Code Division Multiple Access) network or RNC (Radio Network Controller) of an asynchronous WCDMA (Wideband Division Multiple Access) network, includes acquiring a location information message of MS (Mobile Station), which is provided from the BSS or RNC and stored in the radio operating device; analyzing location information of the MS by utilizing the location information message; and calculating traffic information of the MS including a moving speed of each measurement region by using the analyzed location information.

15 Claims, 25 Drawing Sheets

FOREIGN PATENT DOCUMENTS

| | | |
|---|---|---|
| KR | 10-2003-0070974 A | 9/2003 |
| KR | 10-20030071362 A | 9/2003 |
| KR | 10-20030088097 A | 11/2003 |
| KR | 10-2004-0077285 A | 9/2004 |
| KR | 10-20040105272 A | 12/2004 |
| KR | 10-2005-0078687 A | 8/2005 |
| KR | 10-2005-0100121 A | 10/2005 |
| KR | 10-2006-0010961 A | 2/2006 |
| WO | WO2004/066666 A1 | 8/2004 |
| WO | WO2005/088336 A1 | 9/2005 |

* cited by examiner

FIG. 3

| Field | Length (bits) |
|---|---|
| MSG_TYPE('00000101') | 8 |
| ACK_SEQ | 3 |
| MSG_SEQ | 3 |
| ACK_REQ | 1 |
| ENCRYPTION | 2 |
| REF_PN | 9 |
| PILOT_STRENGTH | 6 |
| KEEP | 1 |

Zero or more occurrences of the following record:

| PILOT_PN_PHASE | 15 |
|---|---|
| PILOT_STRENGTH | 6 |
| KEEP | 1 |

| RESERVED | 0 - 7 (as needed) |
|---|---|

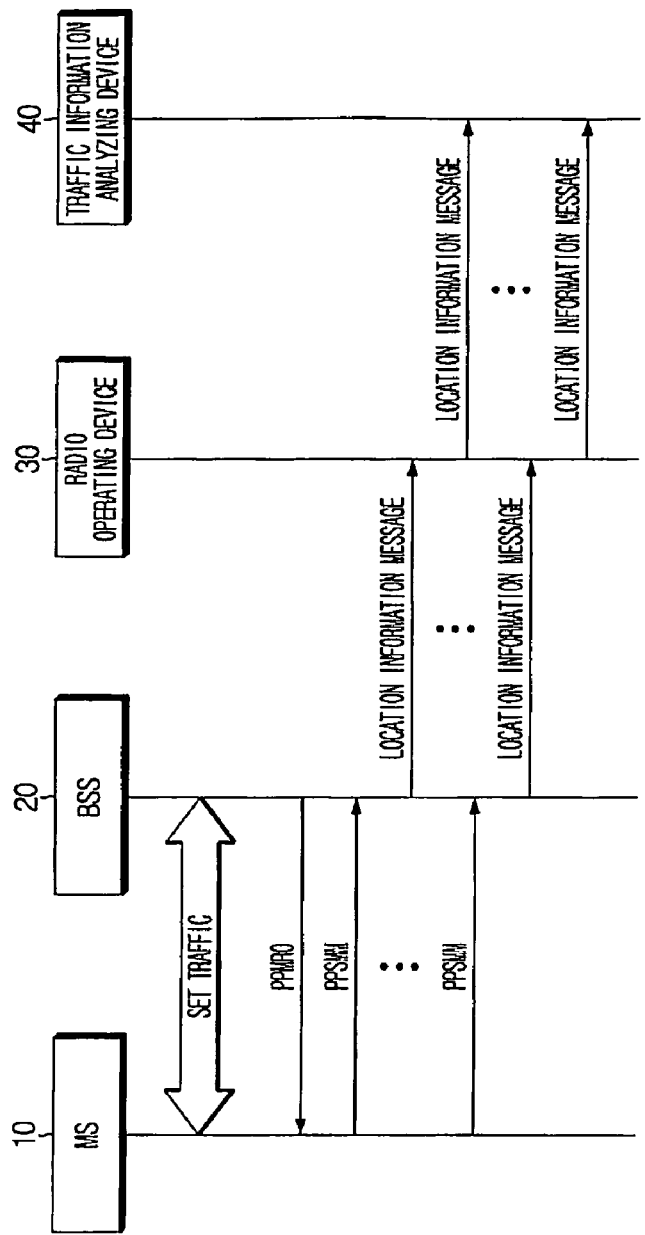

FIG. 6

| Field | Length (bits) |
|---|---|
| MSG_TYPE('00010101') | 8 |
| ACK_SEQ | 3 |
| MSG_SEQ | 3 |
| ACK_REQ | 1 |
| ENCRYPTION | 2 |
| REF_PN | 9 |
| PILOT_STRENGTH | 6 |
| KEEP | 1 |
| SF_RX_PWR | 5 |
| NUM_PILOT | 4 |

NUM_PILOT occurrences of the following record:

| Field | Length (bits) |
|---|---|
| PILOT_PN_PHASE | 15 |
| PILOT_STRENGTH | 6 |
| KEEP | 1 |

| Field | Length (bits) |
|---|---|
| RESERVED | 0 – 7 (as needed) |

FIG. 8

| Field | Length (bits) |
|---|---|
| MSG_TYPE('00000110') | 8 |
| ACK_SEQ | 3 |
| MSG_SEQ | 3 |
| ACK_REQ | 1 |
| ENCRYPTION | 2 |
| ERRORS_DETECTED | 5 |
| PWR_MEAS_FRAMES | 10 |
| LAST_HDM_SEQ | 2 |
| NUM_PILOT | 4 |

NUM_PILOT occurrences of the following field:

| PILOT_STRENGTH | 6 |
|---|---|

| RESERVED | 0 - 7 (as needed) |
|---|---|

FIG. 11

| PARAMETERS | CONTENTS |
|---|---|
| Msg ID | identifying the kind of message |
| Seq ID | serial number occurring at each Job |
| Time | message generation time |
| Duration | call keeping time |
| Mobile ID | MDN or IMSI of MS |
| REF_PN | Reference PN |
| Number of PN | the number of PNs measuredt |
| NID[0] | NID number possessed by system (exchange is classified) |
| BSC[0] | BSC number possessed by system |
| BTS[0] | BTS number possessed by system |
| SEC[0] | Sector number possessed by system |
| PN[0] | PN possessed by system |
| PN_PHASE[0] | Information acquired from MS |
| RTD[0] | Round Trip Delay measured by system |
| ⋮ | ⋮ |
| NID[n] | NID number possessed by system (exchange is classified) |
| BSC[n] | BSC number possessed by system |
| BTS[n] | BTS number possessed by system |
| SEC[n] | Sector number possessed by system |
| PN[n] | PN possessed by system |
| PN_PHASE[n] | information acquired from MS |
| RTD[n] | Round Trip Delay measured by system |

| EQUIPNAME | LATITUDE | LONGITUDE | SID | NID | MSC | BSC | BTS | SECTORCNT | PNA | PNB | PNG |
|---|---|---|---|---|---|---|---|---|---|---|---|
| SL0092X | 37-33-27.966 | 126-58-32.610 | 2189 | 12 | 1 | 0 | 0 | 2 | 144 | 312 | - |
| SL0582X | 37-33-37.778 | 126-58-37.967 | 2189 | 12 | 1 | 1 | 1 | 3 | 110 | 278 | 446 |
| SL0004X | 37-33-41.738 | 126-58-58.488 | 2189 | 12 | 1 | 2 | 2 | 3 | 68 | 236 | 404 |
| SL0568X | 37-33-39.207 | 126-58-48.171 | 2189 | 12 | 1 | 3 | 3 | 2 | 50 | 218 | - |
| SL0300X | 37-33-49.077 | 126-59-05.933 | 2189 | 12 | 1 | 4 | 4 | 3 | 34 | 202 | 370 |
| SL1213X | 37-33-53.697 | 126-58-47.425 | 2189 | 12 | 1 | 5 | 5 | 1 | 134 | - | - |
| SL0616X | 37-33-44.328 | 126-59-22.321 | 2189 | 12 | 1 | 6 | 6 | 2 | 84 | 252 | 0 |
| SL0328X | 37-33-13.793 | 126-58-20.400 | 2189 | 12 | 1 | 7 | 7 | 3 | 64 | 232 | 400 |
| SL0531X | 37-33-12.420 | 126-57-50.918 | 2189 | 12 | 1 | 8 | 8 | 2 | 38 | 206 | - |
| SL0096X | 37-32-33.098 | 126-58-19.067 | 2189 | 12 | 1 | 9 | 9 | 3 | 46 | 214 | 382 |
| SL0367X | 37-32-43.196 | 126-57-54.484 | 2189 | 12 | 1 | 10 | 10 | 3 | 18 | 186 | 354 |
| SL0570X | 37-32-18.953 | 126-58-02.893 | 2189 | 12 | 1 | 11 | 11 | 1 | 80 | 0 | 0 |

FIG. 14

| PARAMETERS | EVENT 1 | EVENT 2 | COMMENTS |
|---|---|---|---|
| Msg ID | 1 | 1 | |
| Seq ID | 1 | 2 | |
| Time | 00:00:00:00 | 00:00:20:00 | |
| Duration | 20 | 40 | |
| Mobile ID | 010-####-#### | 010-####-#### | |
| REF_PN | 4 | 8 | |
| Number of PN | 2 | 2 | |
| NID[0] | 1 | 1 | |
| BSC[0] | 1 | 1 | |
| BTS[0] | 1 | 2 | |
| SEC[0] | 0 | 0 | |
| PN[0] | 4 | 8 | |
| PN_PHASE[0] | 0 | 0 | 1 CHIP UNIT |
| RTD[0] | 1 | 2 | 1/8 CHIP UNIT |
| NID[1] | 1 | 1 | |
| BSC[1] | 1 | 1 | |
| BTS[1] | 2 | 1 | |
| SEC[1] | 0 | 0 | |
| PN[1] | 8 | 4 | |
| PN_PHASE[1] | 2 | 2 | 1 CHIP UNIT |
| RTD[1] | 15 | 14 | 1/8 CHIP UNIT |

FIG. 16

| Information Element/Group name | Need | Multi | Type and reference | Comments |
|---|---|---|---|---|
| Message Type | MP | | Message Type | |
| UE information elements | | | | |
| RRC transaction identifier | MP | | RRC transaction identifier 10.3.3.36 | |
| Integrity check info | CH | | Integrity check info 10.3.3.16 | |
| Measurement Information elements | | | | |
| Measurement Identity | MP | | Measurement Identity 10.3.7.48 | |
| Measurement Command | MP | | Measurement Command 10.3.7.46 | |
| Measurement Reporting Mode | OP | | Measurement Reporting Mode 10.3.7.49 | Event, Periodic |
| Additional measurements list | OP | | Additional measurements list 10.3.7.1 | |
| CHOICE Measurement type | CV-command | | | |
| >Intra-frequency measurement | | | Intra-frequency measurement 10.3.7.36 | CPICH Ec/Io, CPICH RSCP |
| >Inter-frequency measurement | | | Inter-frequency measurement 10.3.7.16 | |
| >Inter-RAT measurement | | | Inter-RAT measurement 10.3.7.27 | |
| >UE positioning measurement | | | UE positioning measurement 10.3.7.100 | Position distance |
| >Traffic Volume measurement | | | Traffic Volume measurement 10.3.7.68 | |
| >Quality measurement | | | Quality measurement 10.3.7.56 | |
| >UE internal measurement | | | UE internal measurement 10.3.7.77 | |
| Physical channel information elements | | | | |
| DPCH compressed mode status info | OP | | DPCH compressed mode status info 10.3.6.34 | |

FIG. 17

| Information Element/Group name | Need | Multi | Type and reference | Semantics description | Version |
|---|---|---|---|---|---|
| Message Type | MP | | Message Type | | |
| UE Information elements | | | | | |
| Integrity check info | CH | | Integrity check info 10.3.3.16 | | |
| Measurement Information Elements | | | | | |
| Measurement identity | MP | | Measurement identity 10.3.7.48 | | |
| Measured Results | OP | | Measured Results 10.3.7.44 | | |
| Measured Results on RACH | OP | | Measured Results on RACH 10.3.7.45 | | |
| Additional Measured results | OP | 1 to <maxAdditionalMeas> | | | |
| >Measured Results | MP | | Measured Results 10.3.7.44 | | |
| Event results | OP | | Event results 10.3.7.7 | | |
| GSM OTD reference cell | OP | | Primary CPICH info 10.3.6.60 | | REL-4 |

FIG. 24

| PARAMETERS | CONTENTS |
| --- | --- |
| Msg ID | identifying the kind of message |
| Seq ID | serial number occurring at each Job |
| Time | message generation time |
| Mobile ID | MDN or IMSI of MS |
|  |  |
| Duration | call keeping time |
| FA | MS service frequency |
| BEST_PSC | Reference PSC |
| Number of PSC | the number of PSCs measured |
| MSC[0] | CN number possessed by system |
| RNC[0] | RNC number possessed by system |
| NodeB[0] | NodeB number possessed by system |
| SEC[0] | Sector number possessed by system |
| PSC[0] | PSC possessed by system |
| RTT[0] | internal information of system |
| ... | ... |
| MSC[n] | CN number possessed by system |
| RNC[n] | RNC number possessed by system |
| NodeB[n] | NodeB number possessed by system |
| SEC[n] | Sector number possessed by system |
| PSC[n] | PSC possessed by system |
| RTT[n] | internal information of system |
| Position Distance | information acquired through MR |

FIG. 25

| EQUIPNAME | LATITUDE | LONGITUDE | MSC | RNC | NodeB | SECTORCNT | PSC Alpha | PSC Beta | PSC Gamma |
|---|---|---|---|---|---|---|---|---|---|
| SL0092X | 37-33-27.966 | 126-58-32.610 | 1 | 12 | 0 | 2 | 144 | 312 | - |
| SL0582X | 37-33-37.778 | 126-58-37.967 | 1 | 12 | 1 | 3 | 110 | 278 | 446 |
| SL0004X | 37-33-41.738 | 126-58-58.488 | 1 | 12 | 2 | 3 | 68 | 236 | 404 |
| SL0566X | 37-33-39.207 | 126-58-48.171 | 1 | 12 | 3 | 2 | 50 | 218 | - |
| SL0300X | 37-33-49.077 | 126-59-05.933 | 1 | 12 | 4 | 3 | 34 | 202 | 370 |
| SL1213X | 37-33-53.697 | 126-58-47.425 | 1 | 12 | 5 | 1 | 134 | - | - |
| SL0616X | 37-33-44.328 | 126-59-22.321 | 1 | 12 | 6 | 2 | 84 | 252 | 0 |
| SL0328X | 37-33-13.793 | 126-58-20.400 | 1 | 12 | 7 | 3 | 64 | 232 | 400 |
| SL0531X | 37-33-12.420 | 126-57-50.918 | 1 | 12 | 8 | 2 | 38 | 206 | - |
| SL0096X | 37-32-33.098 | 126-58-19.067 | 1 | 12 | 9 | 3 | 46 | 214 | 382 |
| SL0367X | 37-32-43.196 | 126-57-54.484 | 1 | 12 | 10 | 3 | 18 | 186 | 354 |
| SL0570X | 37-32-18.953 | 126-58-02.893 | 1 | 12 | 11 | 1 | 80 | 0 | 0 |

FIG. 26

| PARAMETERS | EVENT 1 | EVENT 2 | COMMENTS |
|---|---|---|---|
| Msg ID | 1 | 1 | |
| Seq ID | 1 | 2 | |
| Time | 00:00:00:00 | 00:00:20:00 | |
| Duration | 20 | 40 | |
| Mobile ID | 010-####-#### | 010-####-#### | |
| BEST_PSC | 4 | 8 | |
| Number of PSC | 2 | 2 | |
| MSC[0] | 1 | 1 | |
| RNC[0] | 1 | 1 | |
| NodeB[0] | 1 | 2 | |
| SEC[0] | 0 | 0 | |
| PSC[0] | 4 | 8 | |
| RTT[0] | 1 | 6 | Chip |
| MSC[1] | 1 | 1 | |
| RNC[1] | 1 | 1 | |
| NodeB[1] | 2 | 1 | |
| SEC[1] | 0 | 0 | |
| PSC[1] | 8 | 4 | |
| RTT[1] | 5 | 1 | 1 CHIP UNIT |
| Position Distance | – | – | |

FIG. 27

| PARAMETERS | EVENT 1 | EVENT 2 | COMMENTS |
|---|---|---|---|
| Msg ID | 1 | 1 | |
| Seq ID | 1 | 2 | |
| Time | 00:00:00:00 | 00:00:15:00 | |
| Duration | 20 | 35 | |
| Mobile ID | 010-####-#### | 010-####-#### | |
| BEST_PSC | 4 | 8 | |
| Number of PSC | 2 | 2 | |
| MSC[0] | 1 | 1 | |
| RNC[0] | 1 | 1 | |
| NodeB[0] | 1 | 2 | |
| SEC[0] | 0 | 0 | |
| PSC[0] | 4 | 8 | |
| RTT[0] | 1 | 5 | Chip |
| MSC[1] | 1 | 1 | |
| RNC[1] | 1 | 1 | |
| NodeB[1] | 2 | 1 | |
| SEC[1] | 0 | 0 | |
| PSC[1] | 8 | 4 | |
| RTT[1] | 4 | 2 | 1 CHIP UNIT |
| Position Distance | longitude:126-59-39.918<br>latitude :37-33-40.855 | longitude:126-59-51.567<br>latitude :37-33-43.667 | M |

FIG. 28

| PARAMETERS | EVENT 1 | EVENT 2 | COMMENTS |
|---|---|---|---|
| Msg ID | 1 | 1 | |
| Seq ID | 1 | 2 | |
| Time | 00:00:00:00 | 00:00:20:00 | |
| Duration | 20 | 40 | |
| Mobile ID | 010-####-#### | 010-####-#### | |
| BEST_PSC | 4 | 8 | |
| Number of PSC | 2 | 2 | |
| MSC[0] | 1 | 1 | |
| RNC[0] | 1 | 1 | |
| NodeB[0] | 1 | 2 | |
| SEC[0] | 0 | 0 | |
| PSC[0] | 4 | 8 | |
| RTT[0] | - | - | Chip |
| MSC[1] | 1 | 1 | |
| RNC[1] | 1 | 1 | |
| NodeB[1] | 2 | 1 | |
| SEC[1] | 0 | 0 | |
| PSC[1] | 8 | 4 | |
| RTT[1] | - | - | 1 CHIP UNIT |
| Position Distance | - | - | M |

METHOD AND SYSTEM FOR MEASURING
TRAFFIC INFORMATION IN CDMA
NETWORK

TECHNICAL FIELD

The present invention relates to method and system for measuring traffic information in a CDMA (Code Division Multiple Access) network, and more particularly to method and system for measuring traffic information of vehicles by utilizing a mobile station in a CDMA network.

BACKGROUND ART

In order to monitor traffic information of vehicles, measurement devices such as CC cameras or the like have been installed around roads to measure location, speed and so on of vehicles. However, this method requires installing measurement devices to every road to be monitored, thereby consuming much installation cost and needing many persons for management, and this method is substantially unable to measure traffic information of all roads in the country.

As related arts, Korean Laid-open Patent Publication No. 2003-88097, entitled "Traffic information service system using a wireless LAN, and a method therefor", and No. 2005-78687, entitled "Traffic information service system using a wireless LAN bridge, and a method therefor", disclose a technique for collecting traffic information of a vehicle-mounted terminal to a server using a wireless LAN communication.

However, for the wireless LAN communication, NIC (Network Interface Card) should be provided to each vehicle-mounted terminal, so traffic information can be obtained only from specific vehicle-mounted terminals.

As an alternative, Korean Laid-open Patent Publication No. 2005-100121, entitled "System and method for collecting traffic information using location tracking information of a mobile station", discloses collecting traffic information by using base station information of each road and effective samples of CDR (Call Data Records). This technique reads CDR data files of each exchange to extract effective samples, and processes location inquiry for HLR (Home Location Register) based on the read CDR data files so as to measure a speed of a mobile station installed to a vehicle.

However, in case of Korean Laid-open Patent Publication No. 2005-100121, only mobile stations covered by base stations near a road are measured, and thus, if DB of base stations on or around the road are not updated timely, traffic information may be not collected suitably, and also accuracy of measurement may be deteriorated during the sampling process.

DISCLOSURE OF INVENTION

Technical Problem

The present invention is designed in consideration of the above problems, and therefore it is an object of the invention to provide method and system for measuring traffic information, which collects location information and analyzes traffic information by utilizing location information-related messages exchanged between a mobile station and BSS (Base Station Subsystem) in a synchronous CDMA network.

Another object of the present invention is to provide method and system for measuring traffic information, which collects location information and analyzes traffic information by utilizing location information-related messages exchanged between a mobile station and RAN (Radio Access Network) in an asynchronous WCDMA (Wideband Code Division Multiple Access) network.

Still another object of the present invention is to provide method and system for measuring traffic information, which may prevent system overload by conducting activation control to a location information collecting function of a mobile station for a sub-cell provided in a synchronous CDMA network or an asynchronous WCDMA network.

Technical Solution

In order to accomplish the above object, the present invention provides a method for measuring traffic information, conducted by a traffic information analyzing device interworking with a radio operating device connected to BSS (Base Station Subsystem) of a synchronous CDMA (Code Division Multiple Access) network that includes BTS (Base Transceiver Station) taking charge of communication interface for MS (Mobile Station) and BSC (Base Station Controller) managing radio resources of the BTS, the method comprising: acquiring a location information message of MS, which is provided from the BSS and stored in the radio operating device; analyzing location information of the MS by utilizing the location information message; and calculating traffic information of the MS including a moving speed of each measurement region by using the analyzed location information.

In another aspect of the present invention, there is also provided a method for measuring traffic information, conducted by a traffic information analyzing device interworking with a radio operating device connected to RAN (Radio Access Network) of an asynchronous WCDMA (Wideband Code Division Multiple Access) network that includes Node_B taking charge of communication interface of MS (Mobile Station) and RNC (Radio Network Controller) managing radio resources of the Node_B, the method comprising: acquiring a location information message of MS, which is provided from the RAN and stored in the radio operating device; analyzing location information of the MS by utilizing the location information message; and calculating traffic information of the MS including a moving speed of each measurement region by using the analyzed location information.

BRIEF DESCRIPTION OF THE DRAWINGS

These and other features, aspects, and advantages of preferred embodiments of the present invention will be more fully described in the following detailed description, taken accompanying drawings. In the drawings:

FIG. 3 is a table showing parameters included in PSMM of FIG. 2;

FIG. 4 is a flowchart illustrating a location information acquiring process using PPSMM, conducted according to the present invention;

FIG. 5 is a table showing parameters included in PPMRO of FIG. 4;

FIG. 6 is a table showing parameters included in PPSMM of FIG. 4;

FIG. 8 is a table showing parameters included in PMRM of FIG. 7;

FIG. 11 is a table showing parameters included in a location information message received by a location information acquiring unit of FIG. 10;

FIG. 14 is a table showing an example of a location information message of a mobile station for events 1 and 2 of FIG. 13;

FIG. 16 is a table showing parameters included in MC of FIG. 15;

FIG. 17 is a table showing parameters included in MR of FIG. 15;

FIG. 24 is a table showing examples of parameters included in a location information message received by a location information acquiring unit of FIG. 23;

FIG. 25 is a table showing examples of Node_B latitude/longitude information and PSC information provided by NMS of FIG. 23;

FIGS. 26 to 28 are tables showing examples of location information messages of a mobile station for events 1 and 2 of FIG. 13.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A method for measuring traffic information according to a first embodiment of the present invention acquires location information of a mobile station by utilizing pilot measurement-related messages exchanged between the mobile station and BSS (Base Station Subsystem) in a synchronous CDMA network, and analyzes traffic information based on the acquired location information.

Figure 1:
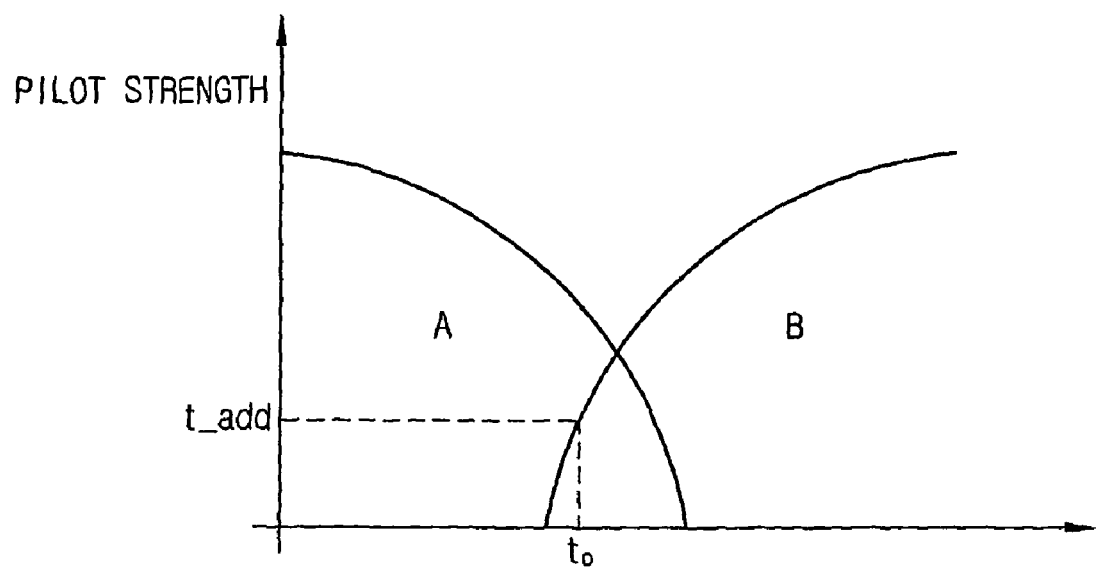
FIG. 1 is a graph showing distribution of pilot strength in an area where handover happens.

That is, since a mobile communication system gives a handover function to ensure call connection though a mobile station departs from a service area A of a current base station and enters a service area B of an adjacent base station, as shown in FIG. 1, the present invention acquires location information and analyzes traffic information by utilizing messages related to pilots that participate in the handover process.

Figure 2:
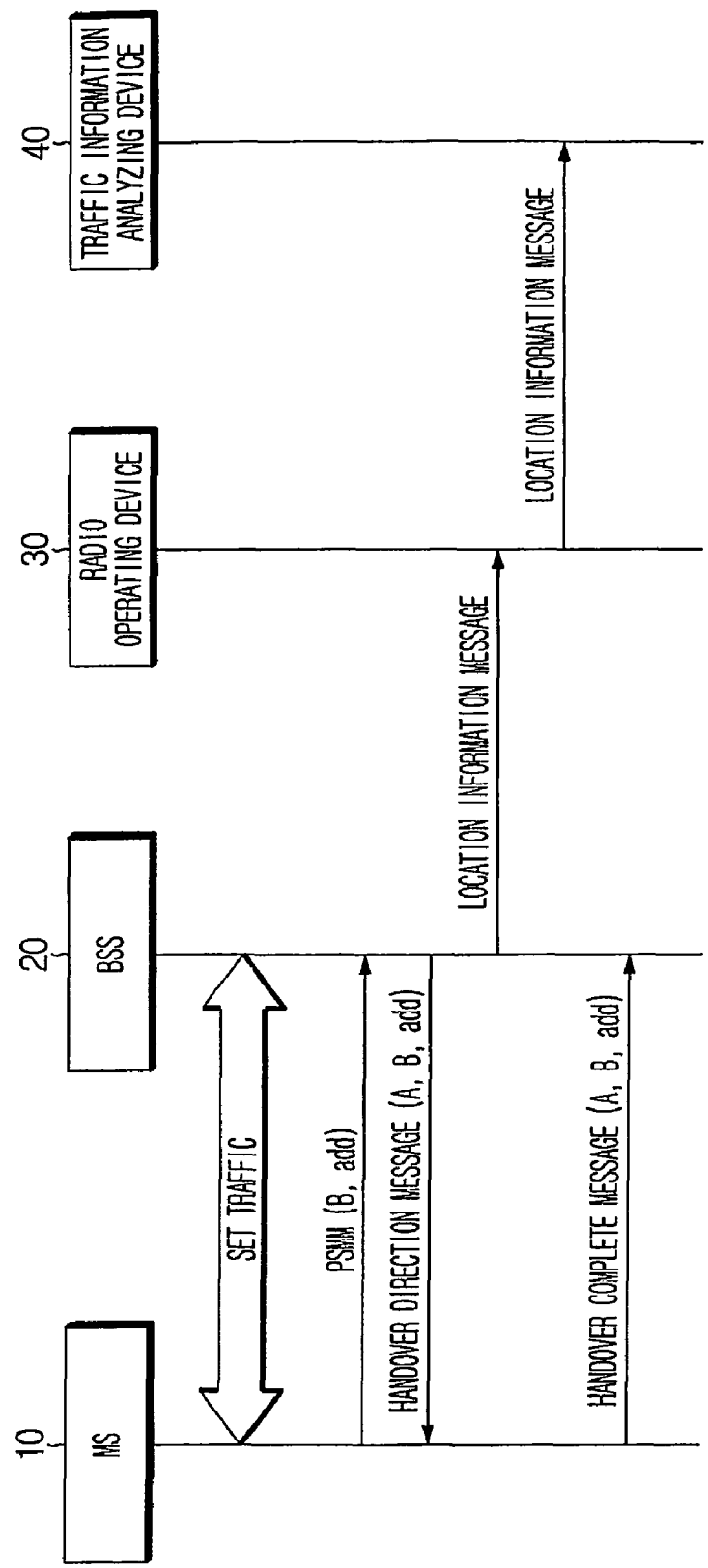
FIG. 2 is a flowchart illustrating a location information acquiring process using PSMM, conducted according to the present invention.

Referring to FIGS. 1 and 2, MS (Mobile Station) 10 sends PSMM (Pilot Strength Measurement Message) to BSS (Base Station Subsystem) 20 when a pilot strength in the B sector, for example, is detected to exceed a threshold value (t_add). Here, FIG. 3 shows examples of parameters included in the PSMM.

BSC (Base Station Controller) included in the BSS 20 analyzes PSMM, and then, if B sector information that is a target sector exists in a neighbor list, the BSC instructs channel allocation to a corresponding BTS (Base Transceiver Station), sends a handover direction message to the MS 10 after channel allocation, and also sends a location information message including RTD (Round Trip Delay) data periodically provided from BTS and data of the PSMM to a radio operating device 30. In this case, in the location information message shown in FIG. 11, field values of Msg ID and Seq ID are composed of a value identifying PSMM and its serial number.

After that, the radio operating device 30 transmits the location information message, sent from the BSS 20 and stored therein, to a traffic information analyzing device 40.

The traffic information analyzing device 40 conducts a measurement process that analyzes location information of the MS 10 and then calculates traffic information of the MS such as a moving distance and a moving speed.

Here, the traffic information analyzing device 40 calculates a distance between BTSes by obtaining BTS latitude/longitude data corresponding to the location information of the MS 10, and then calculates a moving distance and a speed of each measurement region by recognizing a current location of the MS using RTD or PN_PHASE included in the location information message.

Meanwhile, the MS 10 adds a new pilot to an active set, and sends a handover complete message to the BSS 20, thereby completing the handover process.

FIG. 4 mainly shows a process of acquiring location information of a mobile station by substituting PSMM of FIG. 2 with PPSMM (Periodic Pilot Strength Measurement Message).

Referring to FIG. 4, BSS 20 firstly sends PPMRO (Periodic Pilot Measurement Report Order) to MS 10, and the MS 10 sends PPSMM to the BSS 20 at a certain period correspondingly. Here, FIGS. 5 and 6 show examples of parameters included in PPMRO and PPSMM.

BSC of the BSS 20 periodically sends a location information message including RTD periodically provided from BTS and data of the PPSMM to the radio operating device 30. In this case, in the location information message shown in FIG. 11, field values of Msg ID and Seq ID are composed of a value identifying PPSMM and its serial number.

After that, the radio operating device 30 sends the location information message, sent from the BSS 20 and stored therein, to the traffic information analyzing device 40, and the traffic information analyzing device 40 conducts the measurement process as mentioned above to analyze the location information of the MS 10, thereby measuring traffic information of the MS such as a moving distance and a moving speed.

Figure 7:
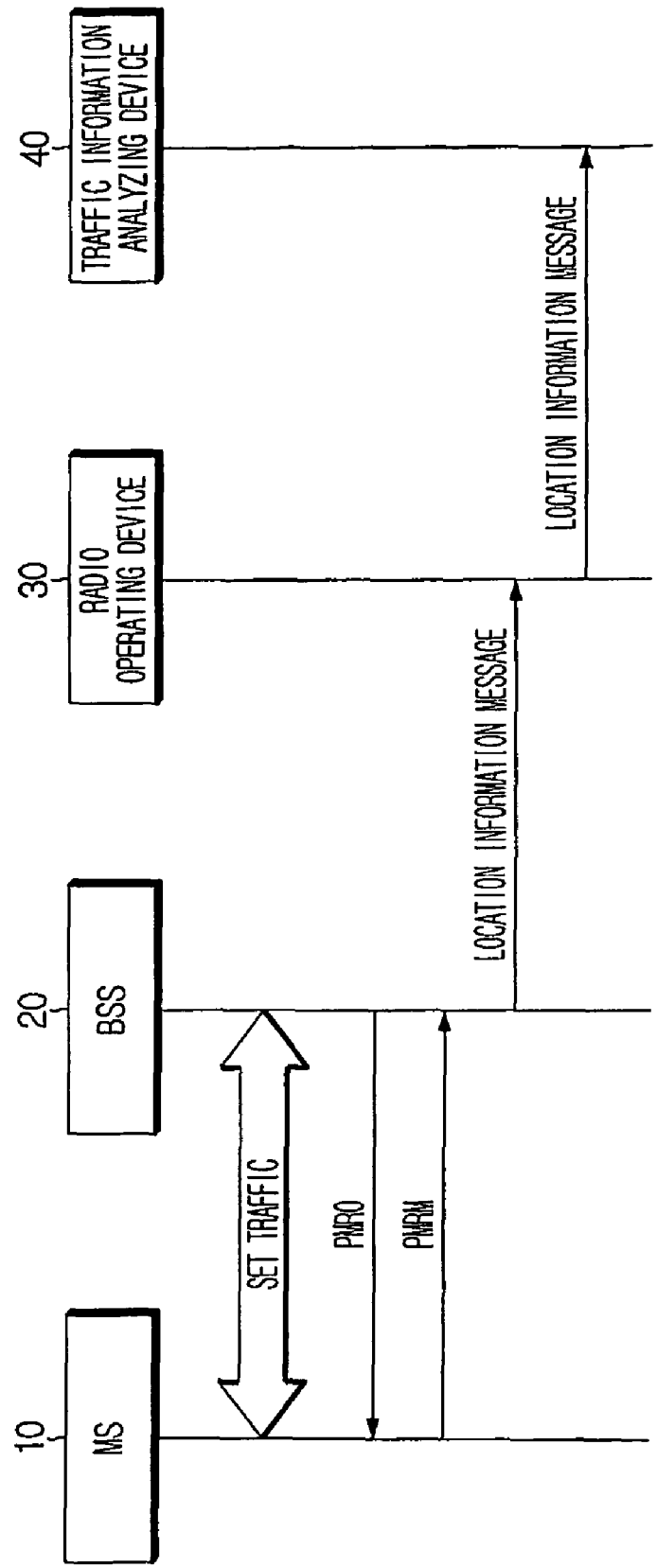
FIG. 7 is a flowchart illustrating a location information acquiring process using PMRM, conducted according to the present invention.

FIG. 7 mainly shows a process of acquiring location information of a mobile station by substituting PSMM of FIG. 2 with PMRM (Pilot Measurement Report Message).

Referring to FIG. 7, the BSS 20 firstly sends PMRO (Pilot Measurement Report Order) to MS 10, and the MS 10 sends PMRM to the BSS 20 at a specific event correspondingly. Here, FIG. 8 shows examples of parameters included in PMRM.

BSC of the BSS 20 sends a location information message including RTD periodically provided from BTS and data of the PMRM to the radio operating device 30. In this case, in the location information message shown in FIG. 11, field values of Msg ID and Seq ID are composed of a value identifying PMRM and its serial number.

After that, the radio operating device 30 sends the location information message, sent from the BSS 20 and stored therein, to the traffic information analyzing device 40.

The traffic information analyzing device 40 conducts the measurement process as mentioned above to analyze the location information of the MS 10 and subsequently measure traffic information of the MS such as a moving distance and a moving speed.

Figure 9:
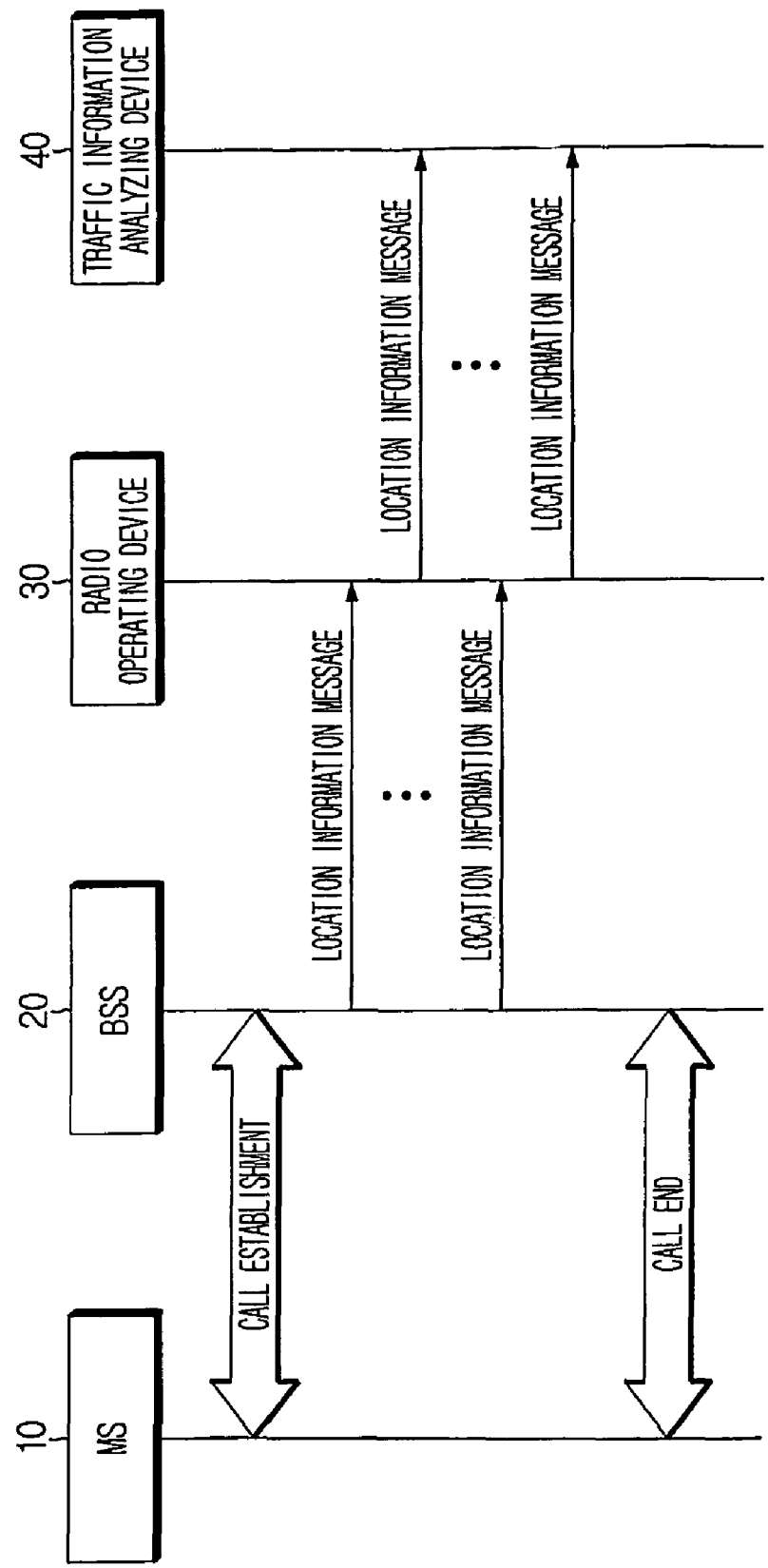
FIG. 9 is a flowchart illustrating a location information acquiring process using BSC's own setting, conducted according to the present invention.

Meanwhile, FIG. 9 shows a process of providing a location information message according to a period set in BSC of the BSS 20 itself during calling, namely in a call-established state. In this case, the BSC includes only RTD provided from BTS, and sends a location information message, from which PN_PHASE of a pilot measurement-related message is excluded, to the radio operating device 30.

After that, the radio operating device 30 sends the location information message, sent from the BSS 20 and stored therein, to the traffic information analyzing device 40.

The traffic information analyzing device 40 conducts the measurement process as mentioned above to analyze the location information of the MS 10 and subsequently measure traffic information of the MS such as a moving distance and a moving speed.

Figure 10:
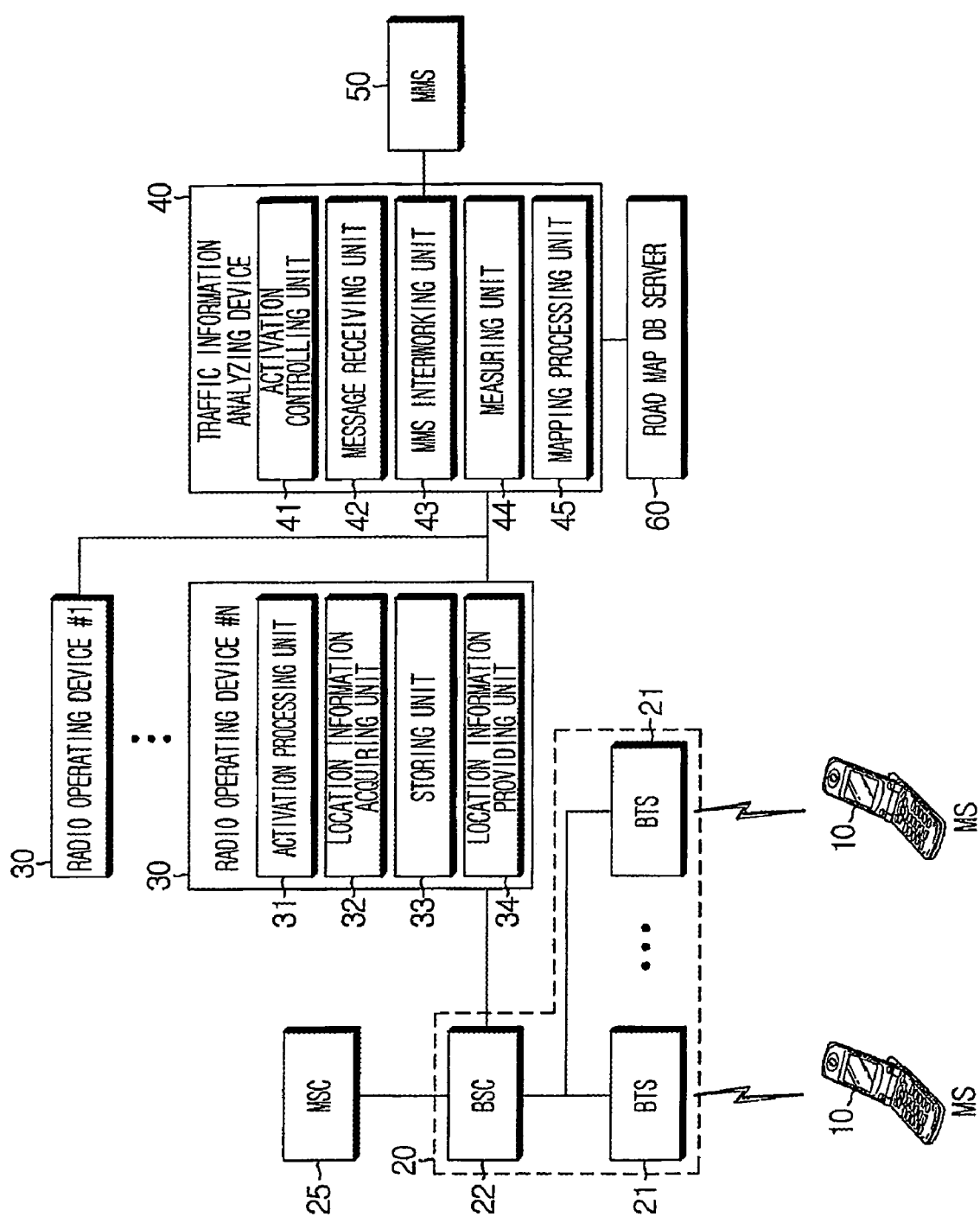
FIG. 10 is a diagram showing a traffic information measuring system according to a first embodiment of the present invention.

FIG. 10 shows a traffic information measuring system according to the first embodiment of the present invention, which is provided for executing the traffic information measuring method as mentioned above.

Referring to FIG. 10, the traffic information measuring system according to the first embodiment of the present invention includes a radio operating device 30 connected to BSS 20 of a synchronous CDMA network to acquire and store location information of MS 10, and a traffic information analyzing device 40 for receiving the location information of the MS 10 from the radio operating device 30 to measure traffic information.

Here, the BSS 20 includes BTS 21 for taking charge of RF sending/receiving interface for MS 10, and BSC 22 for processing setting-up of radio channels, handover and so on to manage radio resources of the BTS 21, and the BSS 20 is connected to MSC (Mobile service Switching Center) that is an essential part of a network subsystem.

In particular, the BSC 22 of the BSS 20 sends a location information message, which includes RTD of MS periodically sent from the BTS 21 and PN_PHASE obtained from PPMSS, PSMM or PMRM collected during handover, to the radio operating device 30.

The location information message includes parameters such as Msg ID, Seq ID, NID, BSC, BTS, SEC, PN, PN_PHASE, RTD and so on, as shown in FIG. 11. Here, PN_PHASE may be obtained from PPSMM, PSMM or PMRM. In addition, NID, BSC, BTS, SEC and PN may be obtained by utilizing a neighbor list provided in the BSC 22 after determining PN using PN_PHASE.

The radio operating device 30 includes an activation processing unit 31, a location information acquiring unit 32, a storing unit 33 and a location information providing unit 34. This radio operating device 30 may be constructed based on a common O&M (Operation and Management) server that manages a BSS 20 in a synchronous CDMA network or a dedicated management server that provides a corresponding function.

The activation processing unit 31 endows a location information collecting function by selectively activating a specific sub-cell under the control of the traffic information analyzing device 40. That is, the activation processing unit 31 gives a function of minimizing loads on the system during the location information collecting process by activating specific MSC, BSC, BTS, SEC and FA among a plurality of systems composing a synchronous CDMA network.

The location information acquiring unit 32 receives the location information message sent from the BSC 22 of the BSS 20 and stores the location information message to the storing unit 33. Here, the location information message may be periodically stored during calling. As an alternative, the location information message may be stored whenever the location information message is sent to the location information acquiring unit 32 after the PPSMM, PSMM or PMRM is received to the BSC, or stored at a period previously set in the BSC.

The location information providing unit 34 sends the location information message stored in the storing unit 33 to the traffic information analyzing device 40 upon request of the traffic information analyzing device 40 or by itself.

The traffic information analyzing device 40 interworking with the radio operating device 30 includes an activation controlling unit 41, a message receiving unit 42, a NMS (Network Management System) interworking unit 43, a measuring unit 44 and a mapping processing unit 45.

The activation controlling unit 41 controls the activation processing unit 31 of the radio operating device 30 so that a location information message collecting function is endowed to a specific sub-cell among sub-cells of a synchronous CDMA network.

The message receiving unit 42 takes charge of receiving the location information message sent by the location information providing unit 34 of the radio operating device 30.

Figures 12, 13:
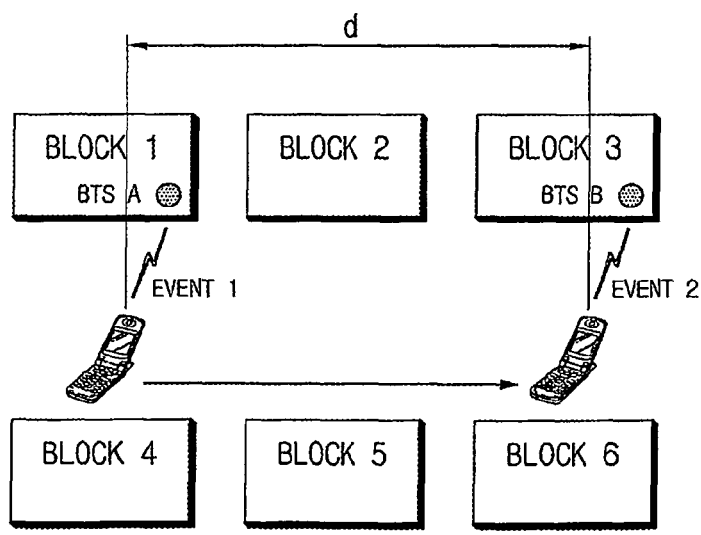
FIG. 12 is a table showing examples of BTS latitude/longitude information and PN information provided by NMS of FIG. 10.
FIG. 13 shows an example of a moving state of a mobile station.

The NMS interworking unit 43 interworks with a common NMS (Network Management System) 50 taking charge of overall operation of a synchronous CDMA network to acquire latitude/longitude data of BTS covering the MS, PN information, direction of antenna, and relay latitude/longitude data. FIG. 12 shows examples of BTS latitude/longitude information and PN information. In FIG. 12, the fields PNA, PNB and PNG respectively indicate PN information of α sector, β sector and γ sector.

The measuring unit 44 analyzes location information of MS 10 by using the location information message received in the message receiving unit 42, and calculates traffic information of the MS 10 including a moving speed of each measurement region. That is, the measuring unit 44 calculates an absolute distance between BTSes by using the BTS latitude/longitude data obtained by the NMS interworking unit 43, and calculates a moving distance and a speed of each measurement region by recognizing a current location of the MS using RTD or PN_PHASE included in the location information message.

The mapping processing unit 45 conducts a function of mapping and displaying the traffic information of the MS such as a moving distance and a speed, calculated by the measuring unit 44, on a road map. Here, the road map is commonly provided by means of interworking with a common road map DB server 60.

Now, an example of traffic information measurement conducted by the traffic information measuring system according to the first embodiment of the present invention will be explained with reference to FIGS. 13 and 14. This example corresponds to a case in which PN_PHASE and RTD information are all acquired.

The traffic information analyzing device 40 receives the location information message provided from the BSS 20 and stored in the radio operating device 30, and then analyzes RTD, for example, to recognize location of MS.

Here, a location of MS at an event 1 is recognized to be on a road adjacent to BTS A by calculating directions of sector antennas of BTSes A and B and a point spaced apart from the BTS A by 1/8 chip and spaced apart from the BTS B by 15/8 chip, utilizing mechanical technique such as a trigonometric function.

In addition, a location of MS at an event 2 is recognized to be on a road adjacent to BTS B by calculating directions of sector antennas of BTSes A and B and a point spaced apart from the BTS A by 15/8 chip and spaced apart from the BTS B by 2/8 chip, utilizing mechanical technique such as a trigonometric function.

If the locations at both events are completely recognized, a moving distance d between both events may be calculated, and the moving distance d is calculated to be about 430 m in this example.

Thus, the MS is analyzed to move at a speed of about 77 km/Hour (≈430 m/20 sec×3600 sec/Hour).

In case RTD does not exist in the location information message, traffic information may be calculated utilizing the PN_PHASE value. In addition, if there is no PN_PHASE information, traffic information may be calculated by analyzing only PN, and any error caused in this case may be corrected by utilizing REF PN and Active PN at the same time.

Meanwhile, a method for measuring traffic information according to a second embodiment of the present invention acquires location information of a mobile station by utilizing pilot measurement-related messages exchanged between the mobile station and RAN (Radio Access Network) in an asynchronous WCDMA network, and analyzes traffic information based on the acquired location information.

Figure 15:
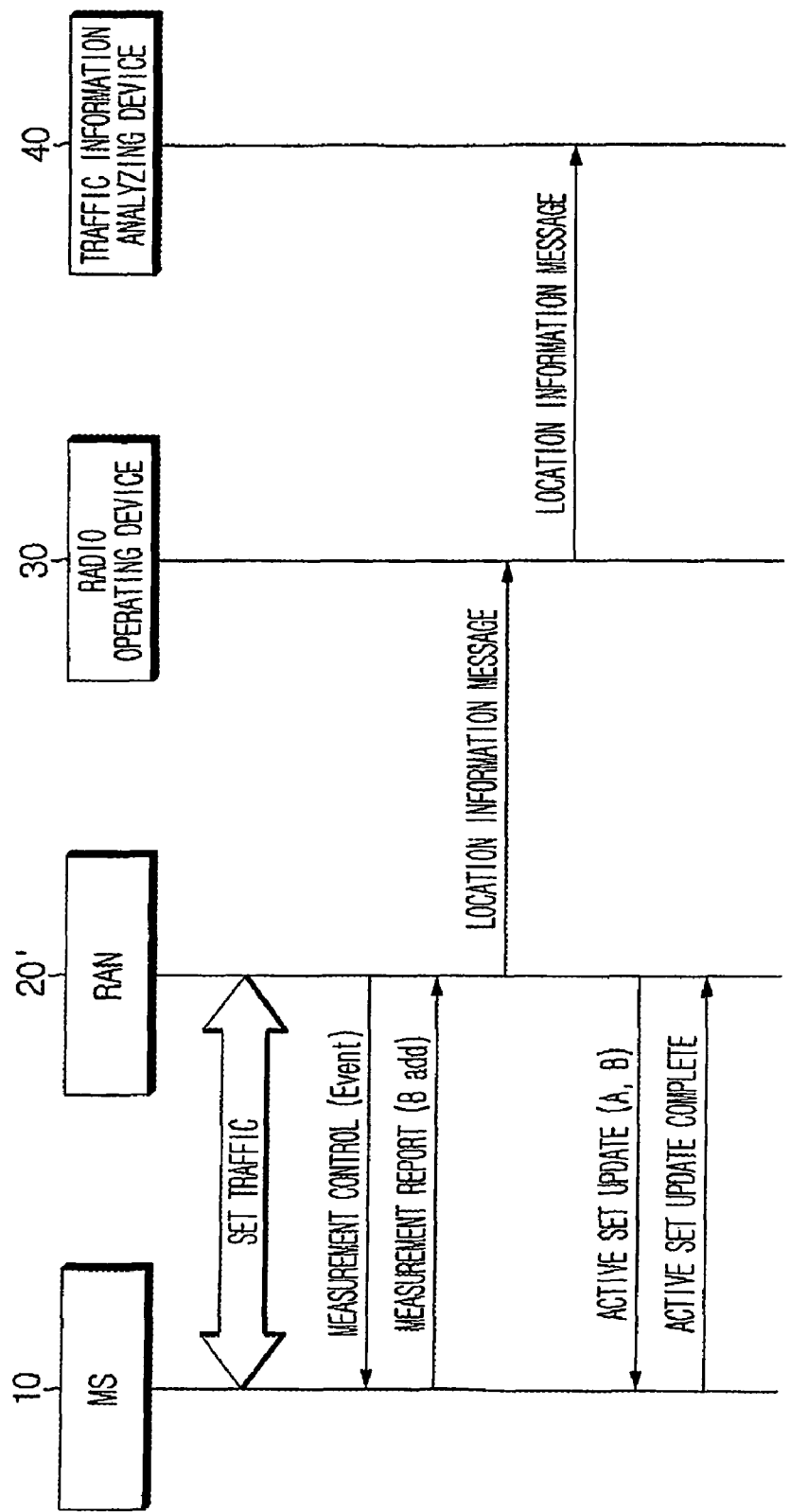
FIG. 15 is a flowchart illustrating a location information acquiring process utilizing Event MR, conducted according to the present invention.

Referring to FIG. 15, RAN 20' sends a MC (Measurement Control) message to MS 10 at a specific event so as to process handover, and the MS 10 sends a MR (Measurement Report) message to the RAN 20' for ADD of a Node_B B. Here, FIGS. 16 and 17 respectively show examples of parameters included in the MC and MR messages.

After that, the RAN 20' sends a location information message including data included in the MR and internally acquired RTT (Round Trip Time) to the radio operating device 30 and stores the location information message therein. Meanwhile, the RAN 20' analyzes the MR, and then, if information of B sector that is a target sector exists in a neighbor list, the RAN 20' instructs channel allocation to a corresponding Node_B, and then sends an Active Set Update message to the MS 10 after the channel allocation.

The radio operating device 30 transmits the location information message, sent from the RAN 20' and stored therein, to the traffic information analyzing device 40.

The traffic information analyzing device 40 conducts a measurement process that analyzes location information of the MS 10 and then calculates traffic information of the MS such as a moving distance and a moving speed.

Here, the traffic information analyzing device 40 calculates a distance between Node_Bs by obtaining Node_B latitude/longitude data corresponding to the location information of the MS 10, and then calculates a moving distance and a speed of each measurement region by recognizing a current location of the MS using parameters such as RTT, PSC, Cell ID, and UE Position, included the location information message.

If the MS 10 receiving the Active Set Update message acquires a channel of the Node_B B and sends an Active Set Update Complete message to the RAN 20', the handover process is completed.

Figure 18:
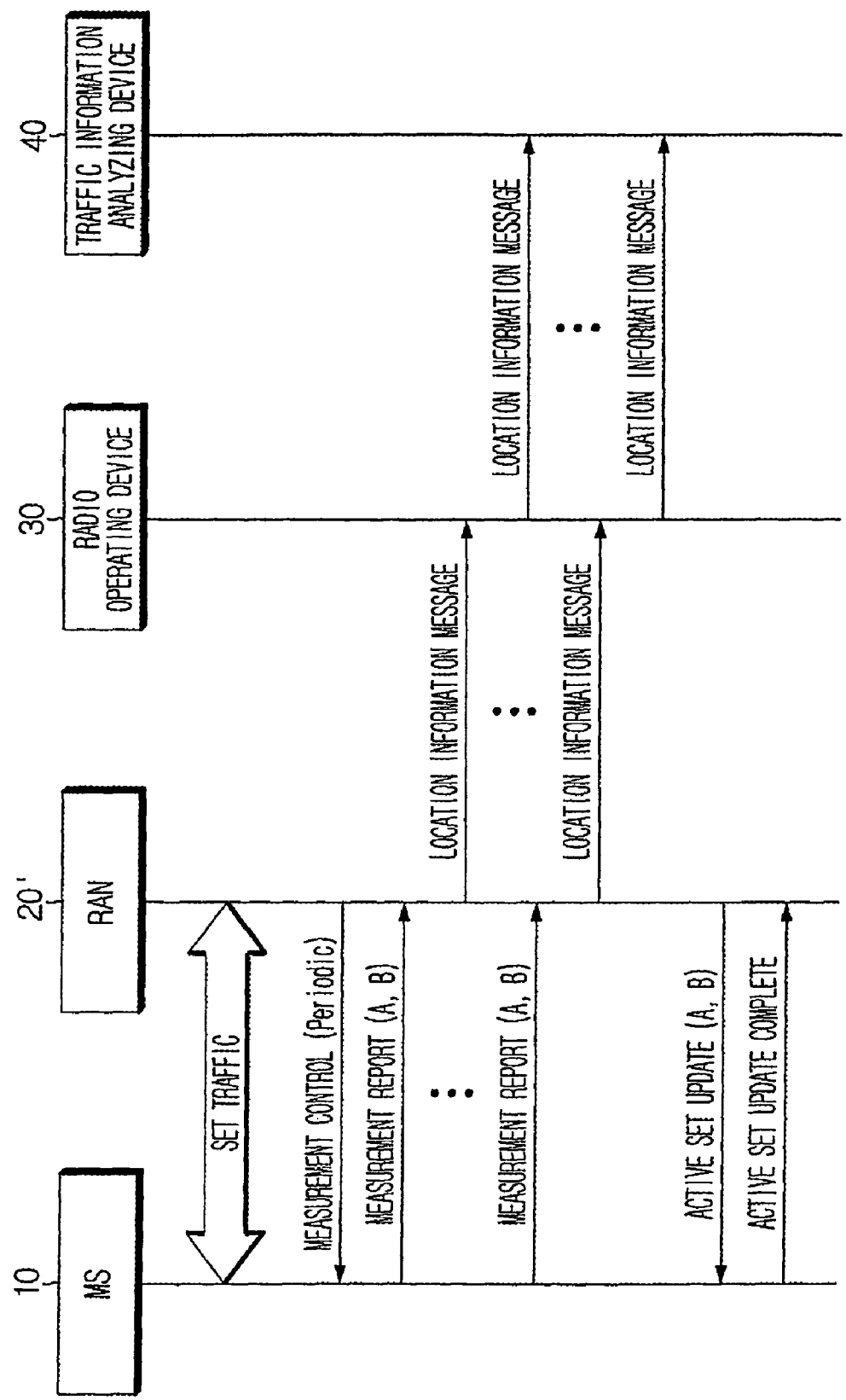
FIG. 18 is a flowchart illustrating a location information acquiring process utilizing Periodic MR, conducted according to the present invention.

FIG. 18 shows a process of acquiring location information of a mobile station by substituting Event MC of FIG. 15 with Periodic MC.

Referring to FIG. 18, if RAN 20' sends a Periodic MC message to MS 10, the MS 10 sends a Periodic MR to the RAN 20' at a predetermined period correspondingly.

When receiving the Periodic MR, the RAN 20' periodically transmits a location information message including data included in MR and internally acquired RTT to the radio operating device 30 and stores the location information message therein, and also performs the handover process as mentioned above.

The radio operating device 30 sends the location information message, sent from the RAN 20' and stored therein, to the traffic information analyzing device 40.

The traffic information analyzing device 40 conducts the measurement process as mentioned above to analyze location information of the MS 10 and calculate traffic information of the MS such as a moving distance and a moving speed.

Figure 19:
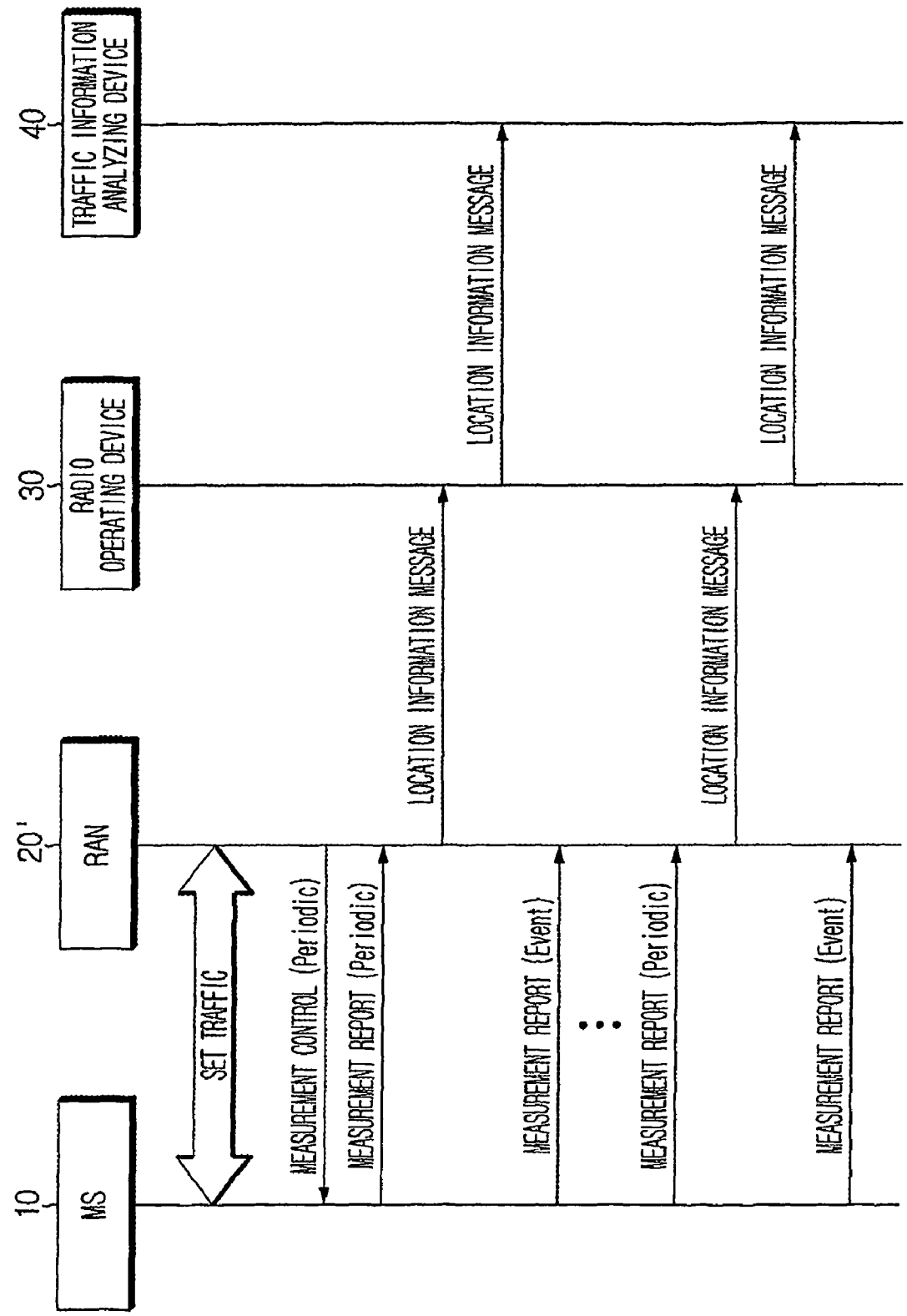
FIG. 19 is a flowchart illustrating a location information acquiring process utilizing Periodic MR and Event MR, conducted according to the present invention.

FIG. 19 shows a process of acquiring location information of a mobile station using Periodic MC and Event MC.

Referring to FIG. 19, if the RAN 20' sends a Periodic MC message to MS 10, the MS 10 sends a Periodic MR to the RAN 20' at a predetermined period correspondingly, and the RAN 20' periodically transmits a location information message including data included in MR and internally acquired RTT to the radio operating device 30 and stores the location information message therein.

In addition, for handover process, the RAN 20' analyzes the Event MR message, instructs channel allocation to a corresponding Node_B in case information of B sector that is a target sector exists in a neighbor list, and then sends an Active Set Update message to the MS 10 after the channel allocation so that a following handover may be processed.

Figure 20:
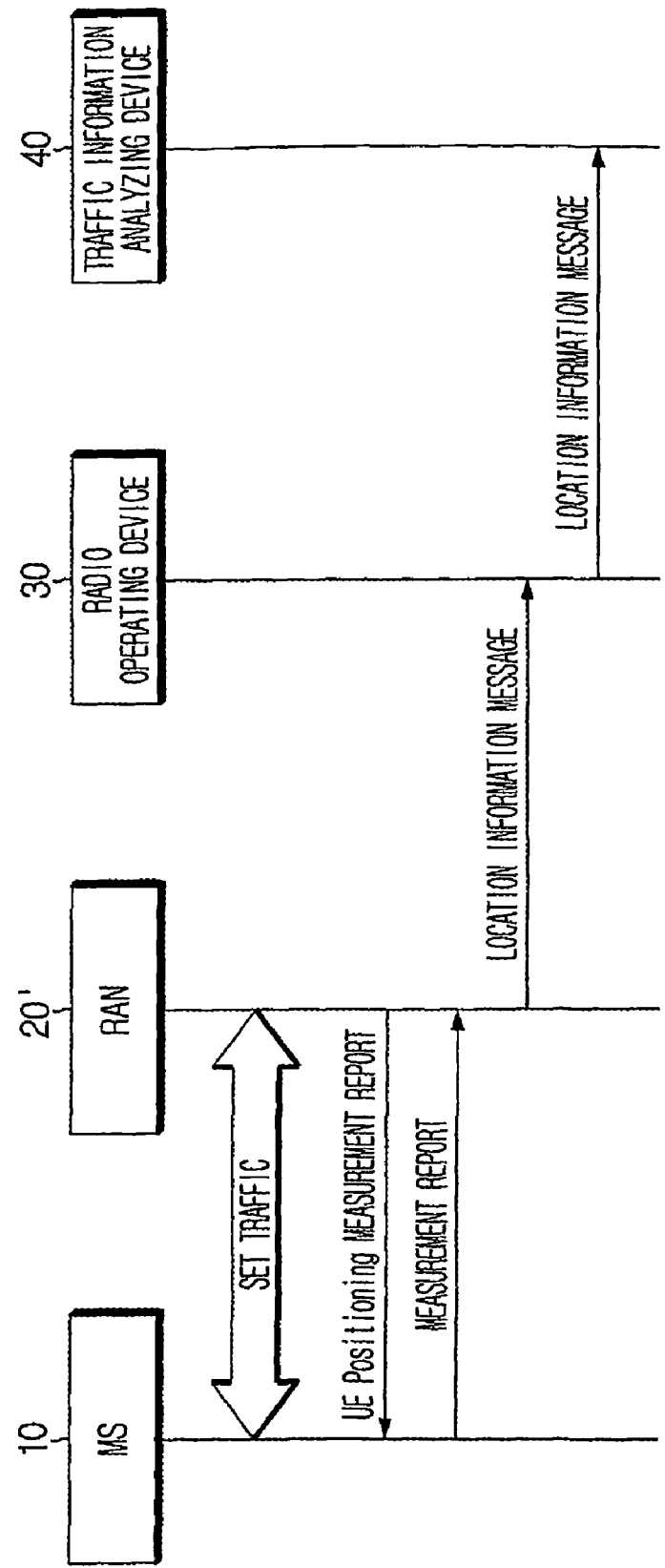
FIG. 20 is a flowchart illustrating a location information acquiring process utilizing UE Positioning MR, conducted according to the present invention.

FIG. 20 shows a process of acquiring location information of a mobile station using UE (User Equipment) Positioning MC.

Referring to FIG. 20, if the RAN 20' sends a UE Positioning MC message to MS 10, the MS 10 sends MR including a moving distance measurement parameter provided to GPS loaded therein to the RAN 20', and the RAN 20' sends a location information message including latitude/longitude data included in the MR and internally acquired RTT to the radio operating device 30 and stores the location information message therein. The RAN 20' may controls the MS 10 to make an event report or a periodic report according to a specific moving distance by means of UE Positioning MC.

Figure 21:
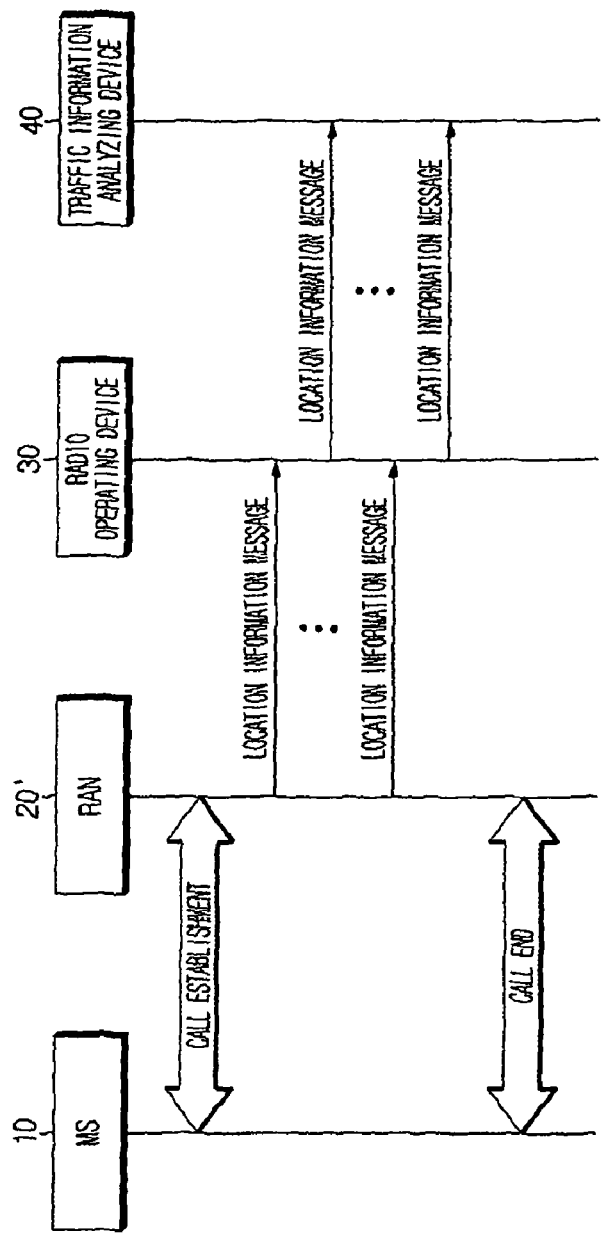
FIG. 21 is a flowchart illustrating a location information acquiring process using RNC's own setting, conducted according to the present invention.

FIG. 21 shows a process of providing a location information message according to a period set in RNC (Radio Network Controller) 22' itself of the RAN 20' during calling, namely in a call-established state. In this case, the RNC 22' periodically sends a location information message including RTT data provided from Node_B and so on to the radio operating device 30.

Figure 22:
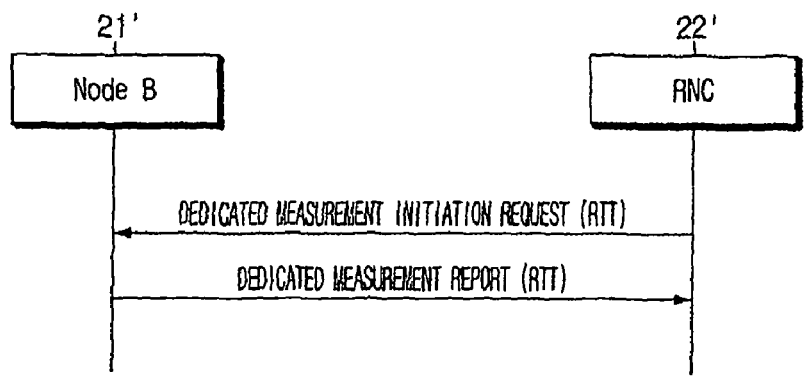
FIG. 22 is a flowchart illustrating a RTT acquiring process in RNC, conducted according to the present invention.

Here, the RTT data may be acquired through the process shown in FIG. 22. That is, the RNC 22' of the RAN 20' sends a Dedicated Measurement Initiation Request message for RTT to Node_B 21' conducting the corresponding service, and receives a Dedicated Measurement Report sent from the Node_B 21' correspondingly. This process should be conducted for Node_B to which a call channel is established with MS before the location information message is sent to the radio operating device 30. The acquired RTT is sent to the radio operating device 30 with being included in the location information message, and then stored therein. After that, the location information message is sent to the traffic information analyzing device 40 and goes through the traffic information measurement process in the same way as above.

Figure 23:
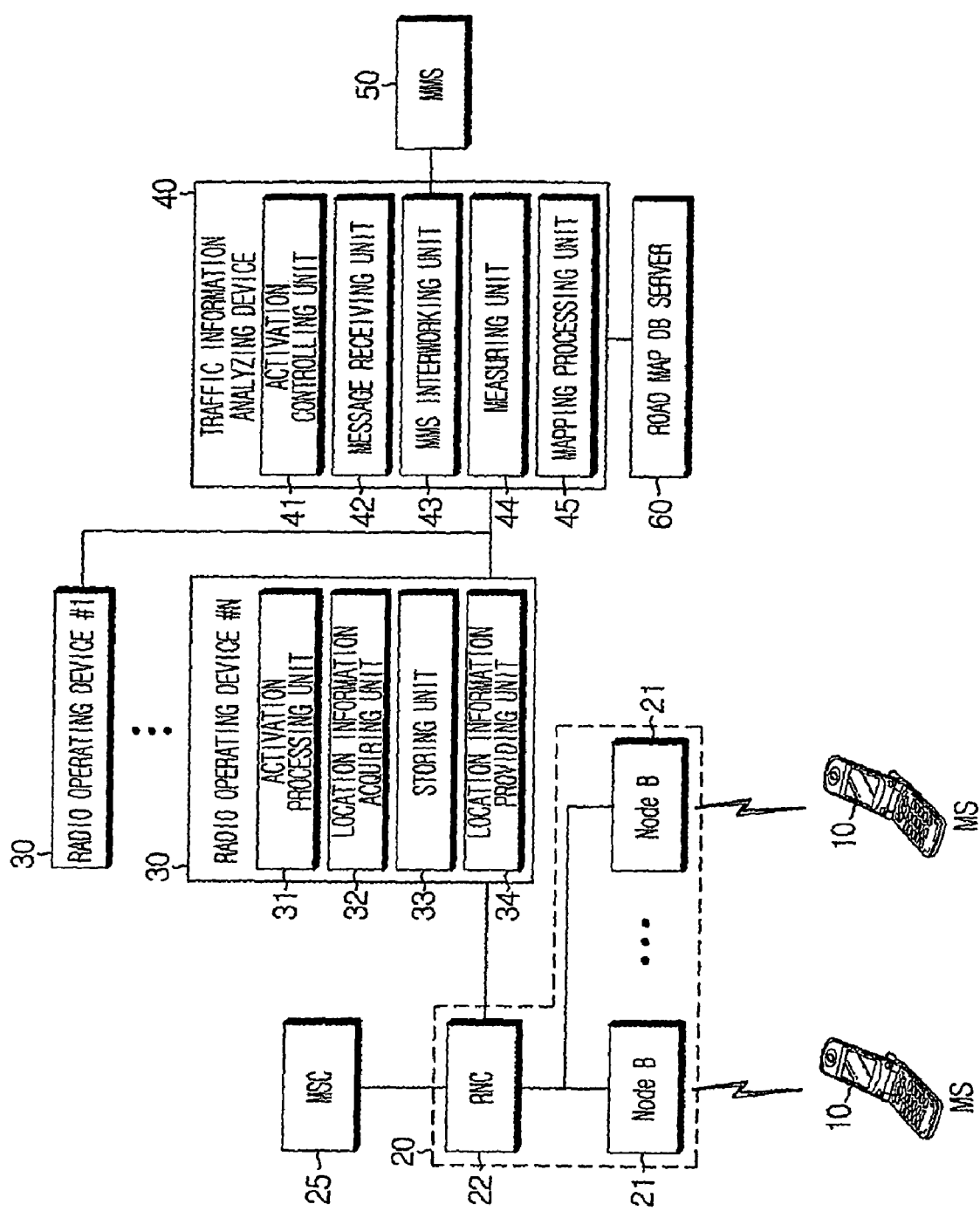
FIG. 23 is a diagram showing a traffic information measuring system according to a second embodiment of the present invention.

FIG. 23 shows a traffic information measuring system according to the second embodiment of the present invention, which is provided to execute the traffic information measuring method explained above.

Referring to FIG. 23, the traffic information measuring system according to the second embodiment of the present invention includes a radio operating device 30 connected to RAN 20' of an asynchronous WCDMA network to acquire and store location information of MS 10, and a traffic information analyzing device 40 for receiving the location information of the MS 10 from the radio operating device 30 to measure traffic information.

Here, the RAN 20' includes Node_B 21' for taking charge of RF sending/receiving interface for MS 10, and RNC 22' for processing setting-up of radio channels, handover and so on to manage radio resources of the Node_B 21', and the RAN 20' is connected to MSC (Mobile service Switching Center) that is an essential part of a network subsystem.

In particular, the RAN 20' sends a location information message including parameter data capable of tracking location of the MS, which is included in RTT data of MS sent from the Node_B 21' according to the request of the RNC 22' of the RAN 20' or Event MR, Periodic MR or UE Positioning MR collected during handover, to the radio operating device 30.

The location information message includes parameters such as Msg ID, Seq ID, Mobile ID, MSC, RNC, Node_B, SEC, PSC, RTT, Position Distance and so on, as shown in FIG. 24. Here, parameters such as MSC, RNC, Node_B, SEC and PSC may be calculated utilizing Cell ID or PSC obtained from MR.

The radio operating device 30 includes an activation processing unit 31, a location information acquiring unit 32, a storing unit 33 and a location information providing unit 34. This radio operating device 30 may be constructed based on a common O&M (Operation and Management) server that manages a RAN 20' in an asynchronous WCDMA network or a dedicated management server that provides a corresponding function.

The activation processing unit 31 endows a location information collecting function by selectively activating a specific sub-cell under the control of the traffic information analyzing device 40. That is, the activation processing unit 31 gives a function of minimizing loads on the system during the location information collecting process by activating specific MSC, RNC, Node_B, SEC and FA among a plurality of systems composing an asynchronous WCDMA network.

The location information acquiring unit 32 receives the location information message sent from the RNC 22' of the RAN 20' and stores the location information message to the storing unit 33. Here, the location information message may be periodically stored during calling. As an alternative, the location information message may be stored whenever the location information message is sent to the location information acquiring unit 32 after the Event MR, Periodic MR or UE Positioning MR is received to the RNC 22', or stored at a period previously set in the RNC.

The location information providing unit 34 sends the location information message stored in the storing unit 33 to the traffic information analyzing device 40 upon request of the traffic information analyzing device 40 or by itself.

The traffic information analyzing device 40 interworking with the radio operating device 30 includes an activation controlling unit 41, a message receiving unit 42, a NMS (Network Management System) interworking unit 43, a measuring unit 44 and a mapping processing unit 45.

The activation controlling unit 41 controls the activation processing unit 31 of the radio operating device 30 so that a location information message collecting function is endowed to a specific sub-cell among sub-cells of an asynchronous WCDMA network.

The message receiving unit 42 takes charge of receiving the location information message sent by the location information providing unit 34 of the radio operating device 30.

The NMS interworking unit 43 interworks with a common NMS (Network Management System) 50 taking charge of overall operation of an asynchronous WCDMA network to acquire latitude/longitude data of Node_B covering the MS, PSC information, direction of antenna, and relay latitude/longitude data. FIG. 25 shows examples of latitude/longitude information of Node_B, and PSC information divided in Node_B and allocated to each sub-cell.

The measuring unit 44 analyzes location information of MS 10 by using the location information message received in the message receiving unit 42, and calculates traffic information of the MS 10 including a moving speed of each measurement region. That is, the measuring unit 44 calculates an absolute distance between Node_Bs by using the Node_B latitude/longitude data obtained by the NMS interworking unit 43, and calculates a moving distance and a speed of each measurement region by recognizing a current location of the MS using RTT, PSC, Cell ID, UE Position and so on, included in the location information message. In addition, the measuring unit 44 may correct location of the MS by utilizing latitude/longitude of relay.

The mapping processing unit 45 conducts a function of mapping and displaying the traffic information of the MS such as a moving distance and a speed, calculated by the measuring unit 44, on a road map. Here, the road map is commonly provided by means of interworking with a common road map DB server 60.

Now, an example of traffic information measurement conducted by the traffic information measuring system according to the second embodiment of the present invention will be explained.

FIG. 26 shows an example of a location information message acquired utilizing Periodic MR. For generation event of Periodic MR, the RAN 20' may set a sending period in the range of about 0.25 to 640 sec.

Referring to FIG. 13 again, location information messages for the events 1 and 2 include parameters as shown in FIG. 26, assuming that a sending period of Periodic MR is 20 seconds, a distance between Node_Bs A and B is about 500 m, and an analyzing unit of RTT is 1 chip (78.125 m).

The location information message shown in FIG. 26 corresponds to the case that RTT information is acquired, and thus the traffic information analyzing device 40 receives the location information message provided from the RAN 20' and stored in the radio operating device 30, and then analyzes RTT to recognize location of MS.

Here, a location of MS at the event 1 is recognized to be on a road adjacent to Node_B A by calculating a direction of a sector antenna of Node_B A, a direction of a sector antenna of Node_B B, and a point spaced apart from the Node_B A by 1 chip and spaced apart from the Node_B B by 6 chip, utilizing mechanical technique such as a trigonometric function.

In addition, a location of MS at the event 2 is recognized to be on a road adjacent to Node_B B by calculating a direction of the sector antenna of Node_B A, a direction of the sector antenna of Node_B B, and a point spaced apart from the Node_B A by 5 chip and spaced apart from the Node_B B by 1 chip, utilizing mechanical technique such as a trigonometric function.

If the locations at both events are completely recognized, a moving distance d between both events may be calculated, and the moving distance d is calculated to be 5 chips (about 390 m) in this example.

Thus, the MS is analyzed to move at a speed of about 70 km/Hour ($\approx$390 m/20 sec$\times$3600 sec/Hour).

FIG. 27 shows an example of a location information message acquired utilizing UE Positioning MR. FIG. 27 shows the case that UE Positioning MC is set as an event location report according to a specific moving distance. In this case, by using BEST_PSC data among parameters included in the location information message or latitude/longitude data included in the US Positioning MR, an advancing direction of a vehicle may be deduced from the Node_B A to the Node_B B, and roads covered by the Node_B may be matched on a road map. Here, a moving speed of a vehicle is analyzed to be 72 km/Hour (=300 m/15 sec$\times$3600 sec/Hour), assuming that a distance between Node_Bs A and B is about 500 m, a condition of sending a location information message from the RAN 20' to the radio operating device 30 is when receiving UE Positioning MR, and a MR sending condition is a specific event when location changes as much as 300 m.

FIG. 28 shows an example of a location information message acquired utilizing Periodic MR. This example corresponds to a case that RTT information cannot be acquired in FIG. 26. In this case, traffic information may be measured using PSC or Cell ID based on BEST_PSC, and it is preferred to average a lot of analyzed data so as to minimize error.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

Industrial Applicability

According to the present invention, location information is collected utilizing a measurement message exchanged between a mobile station and a CDMA network, so it is possible to acquire location information of all mobile stations that receive communication service from the CDMA network and also analyze their traffic information, and also it is possible to construct a system utilizing an existing CDMA network, thereby capable of reducing installation and management costs.

In addition, since the present invention may endow a location information collecting function by activating a specific system of the CDMA network, it is possible to prevent overload on the system when collecting location information.

The invention claimed is:

1. A method for measuring traffic information, conducted by a traffic information analyzing device interworking with a radio operating device connected to BSS (Base Station Subsystem) of a synchronous CDMA (Code Division Multiple Access) network that includes BTS (Base Transceiver Station) taking charge of communication interface for MS (Mobile Station) and BSC (Base Station Controller) managing radio resources of the BTS, the method comprising:
   (a) acquiring a location information message of MS, which is provided from the BSS and stored in the radio operating device;
   (b) analyzing location information of the MS by utilizing the location information message; and
   (c) calculating traffic information of the MS including a moving speed of each measurement region by using the analyzed location information,
   wherein the following step is executed before the step (a):
   the traffic information analyzing device controlling the radio operating device to selectively activate a specific sub-cell among sub-cells of the synchronous CDMA network so that a location information message collecting function is endowed to the specific sub-cell,
   wherein the traffic information analyzing device executes:
   obtaining BTS latitude/longitude data, PN (Pseudo Noise) information, antenna direction and relay latitude/longitude data by interworking with NMS (Network Management System); and
   calculating a distance between BTSs using the BTS latitude/longitude data, and recognizing a current location of the MS using at least one selected from the PN_PHASE, RTD (Round Trip Delay) and PN, thereby calculating a moving distance and a speed of each measurement region.

2. The method for measuring traffic information according to claim 1,
   wherein the location information message includes PN (Pseudo Noise)_PHASE acquired from PPSMM (Periodic Pilot Strength Measurement Message), PSMM (Pilot Strength Measurement Message) or PMRM (Pilot Measurement Report Message) sent from the MS to a sub-cell and then delivered to the BSC, and RTD (Round Trip Delay) sent from the sub-cell to the BSC.

3. The method for measuring traffic information according to claim 2,
   wherein the location information message from the BSC to the radio operating device is stored whenever the PPSMM, PSMM or PMRM is received in the BSC.

4. The method for measuring traffic information according to claim 2,
   wherein the location information message from the BSC to the radio operating device is stored according to a period set in the BSC itself.

5. The method for measuring traffic information according to claim 1, in the step (c), further comprising:
   mapping the calculated traffic information on a road map.

6. A traffic information analyzing device, interworking with a radio operating device in a synchronous CDMA network and provided to a traffic information measuring system for measuring traffic information by utilizing MS, the device comprising:
   a message receiving unit for acquiring a location information message of MS, provided from BSS of the synchronous CDMA network and stored in the radio operating device;
   a measuring unit for analyzing location information of the MS using the location information message, and calculating traffic information of the MS including a moving speed of each measurement region;

a NMS interworking unit for acquiring BTS latitude/longitude data, PN information, antenna direction and relay latitude/longitude data by interworking with NMS; and an activation controlling unit for controlling the radio operating device so that a location information message collecting function is endowed to a specific sub-cell among sub-cells of the synchronous CDMA network, wherein the measuring unit calculates a distance between BTSs using the BTS latitude/longitude data, and calculates a moving distance and a speed of each measurement region by recognizing a current location of the MS using at least one selected from the PN_PHASE, RTD and PN.

7. The traffic information analyzing device according to claim 6, wherein the location information message includes PN_PHASE acquired from PPSMM, PSMM or PMRM sent from the MS to a corresponding sub-cell and delivered to BSC of the BSS, and RTD sent from the sub-cell to the BSC.

8. The traffic information analyzing device according to claim 6, further comprising a mapping processing unit for mapping the calculated traffic information on a road map by interworking with a road map DB (DataBase) server.

9. A method for measuring traffic information, conducted by a traffic information analyzing device interworking with a radio operating device connected to RAN (Radio Access Network) of an asynchronous WCDMA (Wideband Code Division Multiple Access) network that includes Node_B taking charge of communication interface of MS (Mobile Station) and RNC (Radio Network Controller) managing radio resources of the Node_B, the method comprising:

(a) acquiring a location information message of MS, which is provided from the RAN and stored in the radio operating device;

(b) analyzing location information of the MS by utilizing the location information message; and (c) calculating traffic information of the MS including a moving speed of each measurement region by using the analyzed location information, wherein the following step is executed before the step (a): the traffic information analyzing device controlling the radio operating device to selectively activate a specific sub-cell among sub-cells of the asynchronous WCDMA network so that a location information message collecting function is endowed to the specific sub-cell, wherein the location information message includes PSC (Primary Scrambling Code) or Cell ID acquired from Event MR (Measurement Report) or Periodic MR sent from the MS to a sub-cell and then delivered to the RNC, and a moving distance measurement parameter acquired from UE (User Equipment) Positioning MR sent from the MS to a sub-cell and then delivered to the RNC, and RTT sent to the RNC from a sub-cell in which the MS receives service during calling, and wherein traffic information analyzing device calculates a distance between Node_B s using the Node_B latitude/longitude data, and calculates a moving distance and a speed of each measurement region by recognizing a current location of the MS using at least one selected from the RTT, PSC, Cell ID and UE Position, included in the location information message.

10. The method for measuring traffic information according to claim 9, wherein the location information message from the RNC to the radio operating device is stored whenever the MR is received in the RNC.

11. The method for measuring traffic information according to claim 9, wherein the location information message from the RNC to the radio operating device is stored according to a period set in the RNC itself.

12. The method for measuring traffic information according to claim 9, in the step (c), further comprising:

mapping the calculated traffic information on a road map.

13. A system for measuring traffic information, provided in an asynchronous WCDMA network to measure traffic information by utilizing MS, the system comprising:

a radio operating device including:
a location information acquiring unit for operating and managing RAN and receiving a location information message of MS from RNC of the RAN;
a storing unit for storing the location information message;
a location information providing unit for sending the location information message to outside; and
an activation processing unit for activating a specific location information message collecting sub-cell, and a traffic information analyzing device including:
a message receiving unit for acquiring the location information message of the MS, stored in the radio operating device;
a measuring unit for calculating traffic information of the MS including a moving speed of each measurement region by analyzing location information of the MS using the location information message, and an activation controlling unit for controlling the radio operating device so that a location information message collecting function is endowed to a specific sub-cell among sub-cells of the synchronous CDMA network, wherein the location information message includes PSC or Cell ID acquired from Event MR or Periodic MR sent from the MS to a sub-cell and then delivered to the RNC, and a moving distance measurement parameter acquired from UE Positioning MR sent from the MS to a sub-cell and then delivered to the RNC, and RTT sent to the RNC from a sub-cell in which the MS receives service during calling, and wherein the measuring unit calculates a distance between Node_B s using Node_B latitude/longitude data, and calculates a moving distance and a speed of each measurement region by recognizing a current location of the MS using at least one selected from the RTT, PSC, Cell ID and UE Position, included in the location information message.

14. A traffic information analyzing device, interworking with a radio operating device in an asynchronous WCDMA network and provided to a traffic information measuring system for measuring traffic information by utilizing MS, the device comprising:

a message receiving unit for acquiring a location information message of MS, provided from RAN of the asynchronous WCDMA network and stored in the radio operating device;

a measuring unit for analyzing location information of the MS using the location information message, and calculating traffic information of the MS including a moving speed of each measurement region; and an activation controlling unit for controlling the radio operating device so that a location information message collecting function is endowed to a specific sub-cell among sub-cells of the synchronous CDMA network and a NMS interworking unit for acquiring Node_B latitude/longitude data, PSC information, antenna direction and relay latitude/longitude data by interworking with NMS, wherein the measuring unit calculates a distance between Node_Bs using the Node_B latitude/longitude data, and calculates a moving distance and a speed of each measurement region by recognizing a current location of the MS using at least one selected from the RTT, PSC, Cell ID and UE Position, included in the location information message.

15. The traffic information analyzing device according to claim 14, further comprising a mapping processing unit for mapping the calculated traffic information on a road map by interworking with a road map DB server.

* * * * *